Figure 1:
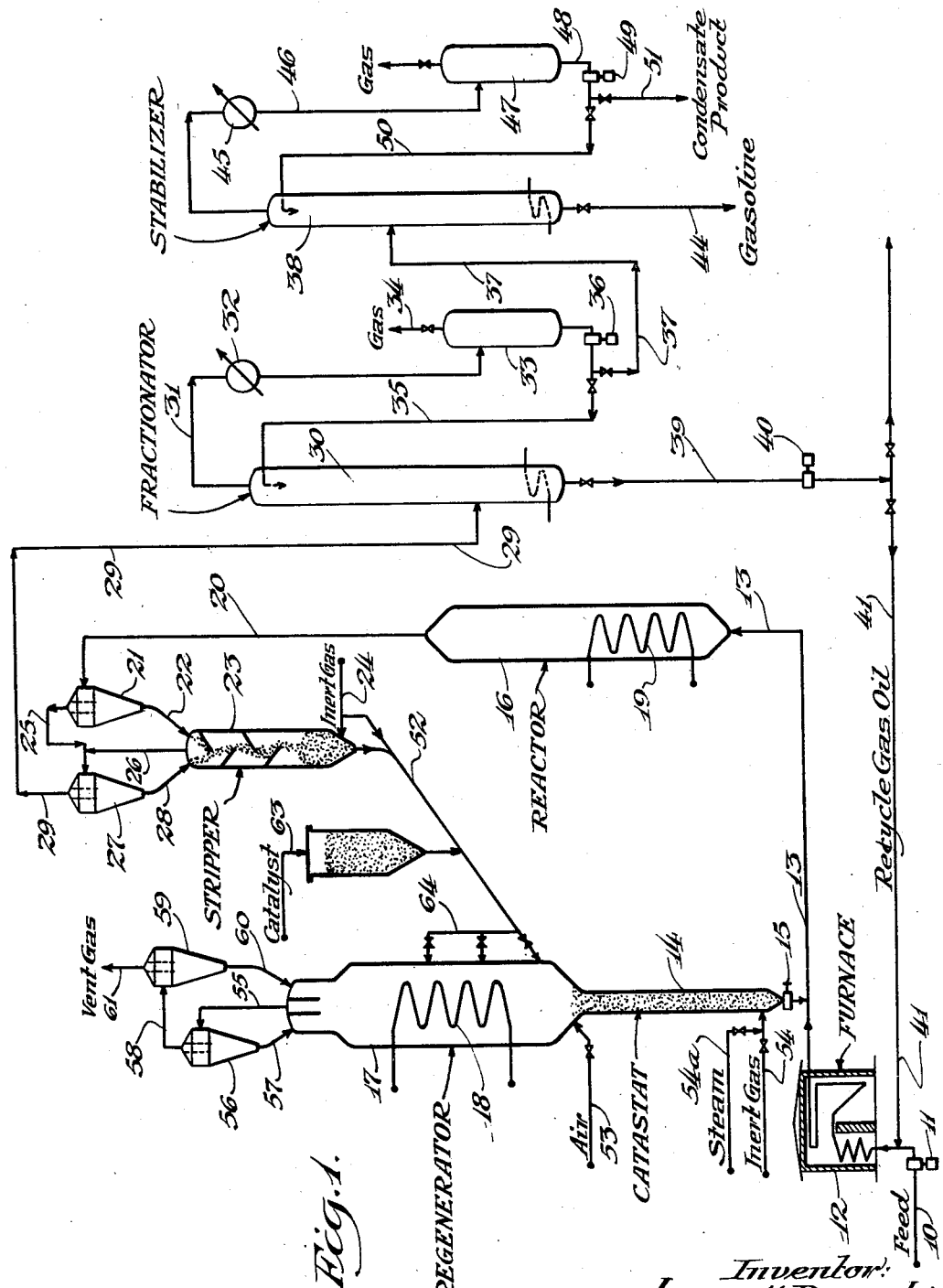

Nov. 15, 1949     J. M. PAGE, JR     2,488,027
METHOD AND APPARATUS FOR CATALYTIC CONVERSION
Filed Jan. 31, 1941     2 Sheets-Sheet 1

Inventor:
James M. Page, Jr.
By Everett A. Johnson
Attorney

Patented Nov. 15, 1949

2,488,027

UNITED STATES PATENT OFFICE 2,488,027

METHOD AND APPARATUS FOR CATALYTIC CONVERSION

James M. Page, Jr., Chicago, Ill., assignor to Standard Oil Company, Chicago, Ill., a corporation of Indiana Application January 31, 1941, Serial No. 376,763

12 Claims. (Cl. 196—52)

This invention relates to a catalytic conversion system and it pertains more particularly to a system for the catalytic production of high quality motor fuel. Related applications include Scheineman Ser. No. 392,848, filed May 10, 1941; Scheineman Ser. No. 400,956, filed July 3, 1941; Scheineman Ser. No. 440,566, filed April 27, 1942; Gunness Ser. No. 400,958, filed July 3, 1941; and Johnson Ser. Nos. 392,846-7, both filed May 10, 1941.

In catalytic hydrocarbon conversion processes the endothermic reaction and exothermic regeneration can be effected while the catalyst is suspended in reacting vapors and regeneration gases respectively. In such systems the required pressure differentials are obtained by means of a fluid head of dense aerated catalyst in a standpipe which in this system is called a catastat. My invention relates particularly to an improved method and means for combining the reactor, regenerator, and standpipe.

An object of my invention is to avoid or minimize cooling of catalyst after regeneration. A further object is to provide a catalyst system requiring only one pressuring standpipe to obtain circulation of the powdered or granular catalyst. A still further object is to control the regeneration and reaction temperatures.

Other objects will become apparent from the following detailed description read in conjunction with the accompanying drawings which form a part of this specification and which schematically represent flow diagrams of my improved system as applied to a catalytic cracking system.

The above and other objects are attained by providing a regeneration zone above, and integral with, the standpipe and by heat exchange between the regeneration zone and reaction zone.

I claim no novelty in any catalyst per se and the selection of the catalyst will depend upon the nature of the conversion process. The catalyst is preferably in the form of hard, porous particles of about 150 to 400 mesh. The apparent density of the catalyst at rest can be about 30 to 50 pounds per cubic foot. The catalyst is rendered fluent by aeration or by the use of upflowing gas or vapor streams to a density of between about 10 to 25 pounds per cubic foot, for example about 20 pounds per cubic foot. With catalyst particles of 150 to 400 mesh size, I prefer aeration at a superficial gas velocity of between about 0.1 and 0.2 feet per second. It should be understood, however, that the linear velocity of the aeration gas will be somewhat dependent upon the catalyst particle size, catalyst density, etc. Generally speaking the superficial velocity of the aerating gas should be between about 0.05 and 0.3 feet per second.

My invention can be applied to various conversion processes including cracking, hydrogenation, dehydrogenation, aromatization, alkylation, isoforming, reforming, etc. but will be described with particular reference to catalytic cracking of heavy hydrocarbon oils to produce high quality motor fuel.

Heavy hydrocarbons such as gas oil and vaporizable hydrocarbon oils in general can be converted into gasoline with yields of between about 30 and 60 percent per pass by vaporizing the oils and contacting the vapors with finely divided solid catalytic materials in suspension at temperatures within the conversion range, usually of the order of between 800° F. and 1000° F. Various catalysts can be used. It is preferred, however, to employ solid cracking catalysts of the metal oxide type such as silica-alumina, silica-magnesia, alumina-zirconia, silica-zirconia-alumina, silica gel promoted with metal oxides adsorbed thereon, for example magnesia and/or alumina, acid treated bentonite and other acid treated clays, for example Super Filtrol, and other natural and synthetic catalysts of the solid metal oxide type.

A pressure of between about 0 and 50 pounds per square inch gauge, for example 25 pounds per square inch, and a holding time, i. e., the average residence time of the catalyst within the reactor, of between about 0.5 and 60 minutes, for example about 5 minutes, can be used. A space velocity, i. e., volume of liquid oil per volume of catalyst in the reactor per hour, of between about 0.5 and 20, for example a space velocity of about 5 can be used. The volume of catalyst is the volume occupied by the catalyst present in the reactor at any one instant measured at rest. It is contemplated that high space velocities will be used with low holding times, and vice versa, these and other conditions being combined to effect the desired degree of cracking. If desired the catalytic cracking can be conducted in the presence of hydrogen. The use of small amounts of hydrogen cuts down the formation of coke very markedly and increases the efficiency of the catalyst by decreasing the necessity of regeneration.

My invention can be used in catalytic reforming of straight-run or cracked naphtha. Preferred catalysts in my process when applied to reforming are the oxides of the metals of the left-hand column of group VI of the periodic table, particularly chromium, molybdenum and tungsten, but I can also use other metal oxides and other metal compounds, particularly oxides of the metals of the left-hand columns of groups IV and V of the periodic table such as titanium, cerium, thorium and vanadium. Moreover, while these catalytic oxides can be used alone or on various supports including magnesia, I find it preferable to utilize them on alumina as a support. It will also be apparent that mixed catalyst can be used.

When cracked naphthas are reformed I prefer to use a pressure of between about 30 and 250 pounds per square inch, for example between 30 and 100 pounds per square inch. Straight-run naphthas can be treated under higher pressures of between 30 pounds per square inch and 450 pounds per square inch, for example from 50 to 300 pounds per square inch. An average catalyst bed temperature of at least 875° F. and not higher than about 1075° F., for example a temperature of about 980° F. can be used.

A space velocity, i. e., volume of liquid oil per volume of catalyst per hour, of between 0.04 and 10, preferably about 0.1 and 5.0, for example a space velocity of about 1.0 can be used, the volume of catalyst being the volume of the catalyst present in the reactor at any one instant measured at rest or in the compacted condition. Catalyst holding times may vary over quite a wide range from less than one minute to more than twenty-four hours.

The reforming is conducted in the presence of added hydrogen. I measure the amount of hydrogen by the number of mols of hydrogen per mol of charge, calculated on the basis of the mean molecular weight of the charge. A mol ratio of between 0.5 and 8 is preferred.

Figure 2:
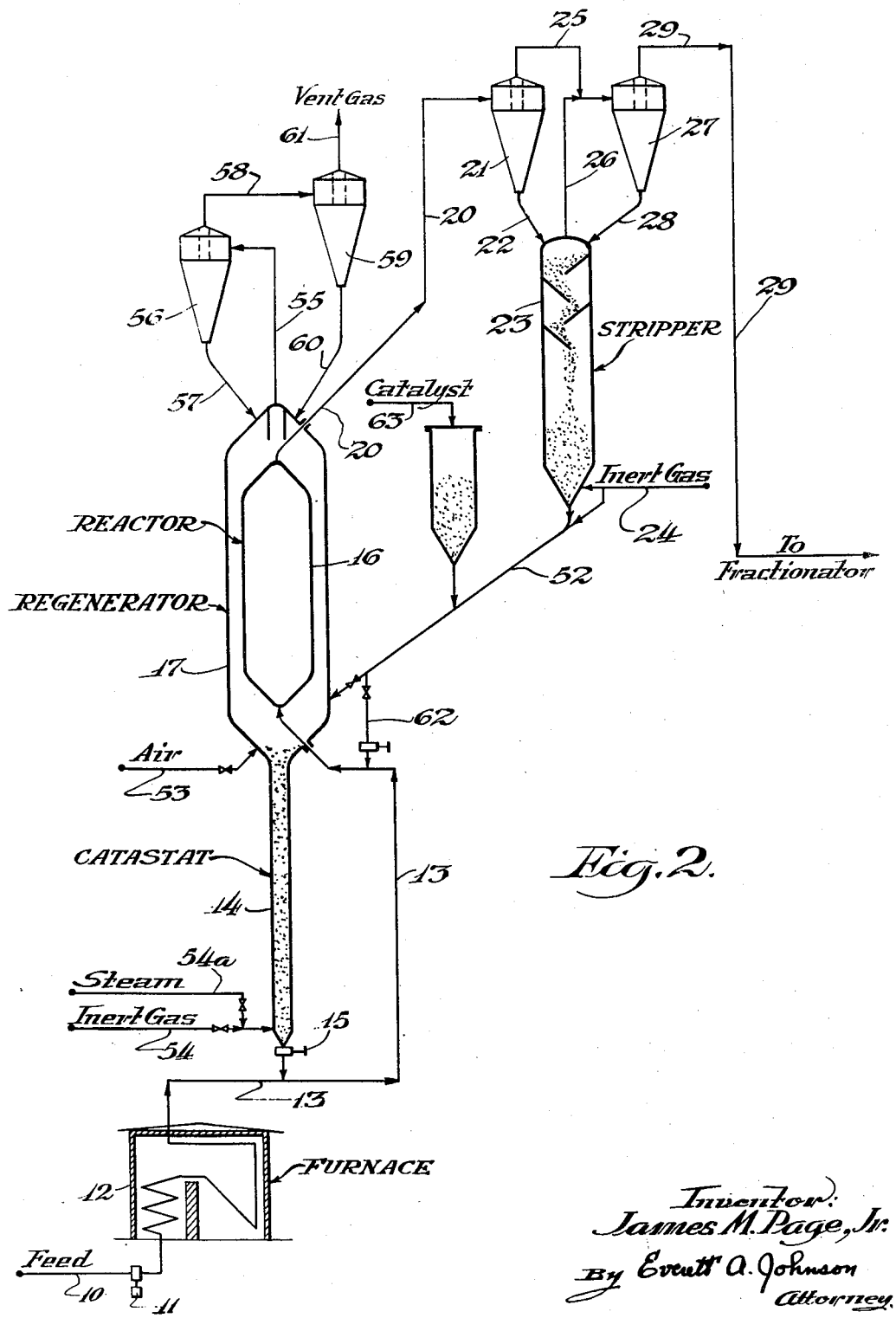

My invention is illustrated by the drawings in which like elements are designated by like reference numerals. Referring to Figures 1 and 2, the feed stock is introduced through line 10 by pump 11 to furnace 12 wherein the charge is vaporized and heated. As the heated vapor passes through transfer line 13 it picks up powdered catalyst from standpipe or "catastat" 14. The catalyst is introduced into the transfer line 13 in amounts regulated by slide valve or star feeder 15. It should be understood, of course, that steam or any other suitable means can be used for introducing the catalyst into transfer line 13 and that the catalyst is carried by the vapors in this line to upflow reactor 16. If desired, the catalyst can be injected directly into the reactor 16 instead of being introduced into the transfer line 13.

Reactor 16 can be a cylindrical vessel with a conical inlet and outlet respectively and of such size and cross-sectional area as to retain the necessary amount of catalyst for effecting the desired amount of conversion. The cross-sectional area should be such as to insure a vertical vapor velocity of between about 0.3 and 3 feet per second in the reactor if the reaction is to be effected under the desired "fluid phase" conditions. For example a reactor having an inside diameter of about 13 feet and a height of about 33 feet and a vapor velocity of about 1.2 feet per second to give a catalyst density of about 11 pounds per cubic foot of reactor space is satisfactory. It should be understood, however, that my invention is not limited to any particular reactor size and shape and that it is only necessary to provide a contact of the vapors with a sufficient amount of catalyst to effect the desired conversion. Velocities necessary to give a certain catalyst concentration will depend on catalyst size.

The reactor 16 can be provided with suitable means in heat transfer relation with the regenerator 17. For example internal coils 18 and 19 or an external shell can be used through which can pass mercury, diphenyl, or molten salts, for example. The heat transfer medium picks up heat in the regenerator 17 and transfers the heat to reactor 16. Thus when fresh feed to the process is heat exchanged, it is brought to the approximate reaction temperature prevailing in reactor 16. If desired the reactor 16 can be placed within the regenerator 17 as illustrated in Figure 2 of the drawings.

Reaction vapors carry catalyst from the top of the reactor 16 at the same rate at which catalyst is introduced into the reactor after a certain quantity of catalyst has accumulated in the reactor and "equilibrium" is reached in the upflow reactor. This catalyst-vapor stream is introduced by line 20 into cyclone separator 21 from the base of which spent catalyst falls through conduit 22 into stripper 23. An inert stripping gas such as steam is introduced through line 24 at the base of the stripping column 23. Reaction vapors leave cyclone separator 21 through line 25 and these vapors, together with stripping gases from line 26, are introduced into cyclone separator 27 from which the remaining catalyst particles are returned to the stripper through conduit 28. The vapors from separator 27 are conveyed by line 29 to a fractionation system for separating a gasoline fraction from lighter and heavier reaction products. It should be understood that any other catalyst-vapor separation can be used instead of, or in conjunction with, the cyclone separators and that any number of cyclone separators can be used either in series or in parallel for effecting the separation.

The reaction vapors pass by line 29 to fractionator 30. Gasoline and gases are taken overhead through line 31 and cooler 32 to reflux drum 33. Gas can be vented from this receiver through line 34. A portion of the liquids can be recycled by valved line 35 and pump 36 as reflux in tower 30. The balance of the liquid is conducted by valved line 37 to stabilizer 38. Gas oil from fractionator 30 is withdrawn by valved line 39 and all or a portion recycled by pump 40 and line 41 to furnace 12. Likewise the recycle gas oil can be subjected to solvent extraction and the raffinate recycled with fresh feed.

Stabilizer 38 is operated at an elevated pressure in the conventional manner. Reflux, pressure, and reboiling are controlled to take stabilized gasoline off the base of tower 38 through valved line 44 for further treatment, storage, or use. Gases eliminated in producing stabilized gasoline pass overhead from stabilizer 38 to condenser 45 by line 46 and thence to reflux drum 47. Condensate is removed from drum 47 by means of valved line 48 and pump 49. A portion of it can be returned to stabilizer 38 as reflux through line 50 and the rest of the condensate can be withdrawn from the system by valved line 51 as the desired product.

Reverting to stripper 23, the stripped spent catalyst is discharged into "downflow" regenerator 17 by lines 52 and/or 64. Catalyst can be recycled to reactor 16 by lines 62 and 13 as shown in Figure 2 of the drawing. Make-up catalyst can be introduced to the system as needed, for example by line 63. The expression "downflow" as herein employed refers to the flow of catalyst from the regenerator and not to flow of gases therein.

In my downflow regenerator, air or other oxygen-containing gas can be introduced at the base of the regeneration zone within chamber 17 through line 53. The regenerated catalyst is withdrawn from the bottom of the regeneration zone and the spent catalyst is introduced at a point above the gas inlet. Within this regeneration zone a catalyst residence time sufficient to permit the combustion of carbonaceous materials is provided. The catalyst density in the regeneration zone can be controlled by vapor velocity therein. I employ such gas velocities as will provide catalyst densities of about 10 to 35 pounds per cubic foot, preferably between about 15 and 30 pounds per cubic foot, for example 20 pounds per cubic foot. Such gas velocities in this case can range between about 0.05 and 2.0 or more feet per second and are preferably between about 0.1 and 1.0 feet per second, all dependent upon catalyst size and particle density. For silica-alumina type catalysts I prefer to avoid temperatures in excess of 1050° F. to 1100° F. but the safe limit will, of course, depend upon the particular catalyst employed.

I provide for extraneous temperature control by using coils 18 or the like for circulating a heat exchange fluid such as fused salt mixture, mercury, molten metal alloys, oil or steam. Likewise the reactor 16 can be constructed within the regenerator 17 as shown in Figure 2.

Regenerated catalyst is withdrawn from the lower portion of the regeneration zone in chamber 17 and is accumulated below the regeneration zone and in standpipe 14. Catalyst is maintained in fluent condition by means of an inert gas such as steam introduced through lines 54 and 54a. The amount of aeration gases should be such as to maintain the catalyst in fluent form and of such density as to provide the necessary pressure head at the base of the standpipe. For obtaining densities of between about 20 and 30 pounds per cubic foot I employ gas velocities of between about 0.05 to 0.2 feet per second in the catalyst.

The regeneration gases carry some of the catalyst overhead by line 55 to cyclone separator 56 and the catalyst is returned to the top of regenerator 17 by conduit 57. Additional catalyst can be removed by separator 59 and returned to regenerator 17 by conduit 60. Vent gases are removed by line 61.

The flow diagram of my process as well as the description thereof is highly simplified and various details such as heaters, coolers, pumps, valves, etc., have been omitted which would merely encumber this specification unnecessarily.

While my invention has been described with reference to certain embodiments thereof, it is to be understood that they can be modified in various ways without departing from the invention and that I do not mean to be limited thereby but only by the appended claims.

I claim:

1. Apparatus for catalytic contacting wherein a fluent catalyst is alternately onstream and regenerated comprising a vertical reaction chamber, means for accumulating catalyst from said reaction chamber, a vertical regeneration chamber, means for dispersing the accumulated catalyst in said regeneration chamber, a substantially vertical conduit of smaller cross-sectional area than said regeneration chamber communicating with the lower part of said regeneration chamber and adapted for accumulating a body of fluent catalyst whereby the pressure head at the base of said conduit is the sum of the pressure developed by the weight of the column of fluent catalyst in said conduit plus the pressure imposed at the top of said conduit by superimposed pressure in the regeneration chamber, means for introducing an inert fluidizing medium into said substantially vertical conduit at a relatively low point therein a valve below said last-named means, a transfer line leading to the base of said reaction chamber from a point below said valve and angularly disposed in respect to said conduit, and means whereby catalyst may be dispersed in amounts regulated by said valve from said conduit to said transfer line and thence back to the base of said reaction chamber.

2. A catalytic contacting apparatus which comprises a first contacting chamber, a second contacting chamber adapted to effect a net downward flow of fluent settled dense phase solid catalyst particles therefrom, downwardly extending conduit means communicating with the second contacting chamber at a low point therein and adapted to accumulate a columnar body of settled catalyst particles therefrom, aerating means for introducing an inert aerating fluid into said conduit, a valve below the aerating means for regulating the flow of catalyst material in the conduit, means for transferring aerated catalyst from a point below the valve in said conduit to said first contacting chamber, means for supplying a different contacting fluid to each of said contacting chambers in volume sufficient to maintain a turbulent catalyst phase therein, means for withdrawing catalyst and contacting fluid from said first contacting chamber, means for separating the catalyst from said contacting fluid and means for introducing said catalyst into said second contacting chamber.

3. The method of operating a catalytic conversion system employing a powdered catalyst in conversion and regeneration zones which method comprises passing hydrocarbon vapors through a conversion zone in contact with a dense turbulent suspended powdered catalyst phase under such conditions as to effect catalytic conversion of said hydrocarbons, removing catalyst from reaction products, stripping deactivated catalyst with an inert gas and introducing said stripped catalyst into a regeneration zone, passing an oxygen-containing gas upwardly in said regeneration zone at such a vertical velocity as to maintain in the lower part of said zone a dense turbulent suspended powdered catalyst phase, withdrawing regeneration gases from the top of said regeneration zone, withdrawing regenerated catalyst as a downwardly moving column from a low point in the regeneration zone at which the catalyst density is at least about 10 pounds per cubic foot, introducing an aeration gas into the downwardly moving column for maintaining catalyst therein in fluent condition, suspending said catalyst from the base of said column at a controlled rate in a hydrocarbon stream and introducing said catalyst along with said stream back to said conversion zone.

4. The method of operating a catalytic conversion system employing a powdered catalyst in conversion and regeneration zones which method comprises passing hydrocarbon vapors through a conversion zone in contact with a dense, fluidized turbulent suspended powdered catalyst phase under such conditions as to effect catalytic conversion of said hydrocarbons, removing catalyst from reaction products, stripping deactivated catalyst with an inert gas and introducing said stripped catalyst into a regeneration zone, passing an oxygen-containing gas upwardly in said regeneration zone at such a vertical velocity as to maintain in the lower part of said zone a dense, fluidized, turbulent suspended powdered catalyst phase, withdrawing regeneration gases from the top of said regeneration zone, withdrawing regenerated catalyst as a downwardly moving column from the dense, fluidized catalyst phase in the regeneration zone, introducing an aeration gas into the downwardly moving column for maintaining catalyst therein in fluent condition, suspending said catalyst from the base of said column at a controlled rate in a hydrocarbon stream and introducing said catalyst along with said stream back to a low point in said conversion zone.

5. The method of contacting small particles of hard solids with three separate gasiform streams which method comprises dispersing said solids in a first gasiform stream, introducing said stream at the lower part of a first contacting zone and passing said stream upwardly in said zone at a sufficiently low velocity to maintain a dense suspended solids phase therein, separating solids from said first stream and countercurrently contacting said separated solids with a second gasiform stream introducing said countercurrently contacted solids into a second contacting zone, introducing a third gasiform stream at the lower part of the second contacting zone and passing said third gasiform stream upwardly in said second contacting zone at a sufficiently low velocity to maintain a dense phase of suspended solids therein, removing said third gasiform stream from the upper part of said second contacting zone while returning entrained solids from said stream to the dense suspended solids phase in the second contacting zone, downwardly withdrawing solids from the lower part of the second contacting zone as an aerated column of substantial height, introducing an aerating gas at a low point in the column in an amount sufficient to maintain the column of solids in fluent form and of such density as to provide a pressure head at its base sufficient to effect the dispersion of solids from the base of the column into said first gasiform stream, and utilizing the pressure head at the base of said column for dispersing solids from said column into said first gasiform stream.

6. The method of effecting catalytic hydrocarbon conversion which comprises introducing a hydrocarbon stream into the lower part of a reaction zone containing hard, porous catalyst particles of about 400 to 150 mesh in particle size, passing said stream in gaseous form upwardly in said zone at a velocity within the approximate range of .3 to 3 feet per second whereby a fluidized dense phase of catalyst is maintained in said zone, maintaining said zone at conversion temperature and pressure whereby hydrocarbon conversion is effected and carbonaceous material accumulates on the catalyst, separating catalyst from said hydrocarbon stream, stripping said separated catalyst with a stripping gas in a stripping zone, combining gas from the stripping zone with said hydrocarbon stream, introducing stripped catalyst from the stripping zone into a regeneration zone, passing an oxygen-containing gas upwardly in the regeneration zone at a velocity within the range of about .1 to about 2 feet per second whereby a fluidized dense phase of catalyst is maintained in said zone, maintaining a temperature, pressure and catalyst residence time in the regeneration zone for effecting combustion of carbonaceous materials from the catalyst, separating and returning catalyst from gases leaving the upper part of the regeneration zone, downwardly withdrawing regenerated catalyst from the lower part of the regeneration zone as an aerated catalyst column of substantial length, introducing an aerating gas at a low point in said column in an amount to maintain the catalyst in fluent form and of such density as to provide a pressure head at the base of the column sufficient to effect transfer of the catalyst from the base of the column to the lower part of the reaction zone and transferring catalyst from the base of the column to the lower part of the reaction zone by introducing it into the hydrocarbon stream prior to the introduction of said stream into the reaction zone.

7. The method of claim 6 which includes the step of introducing stripped catalyst into the regeneration zone at an upper level therein.

8. In a continuous cyclic process for the catalytic conversion of hydrocarbons involving alternately and repeatedly contacting a powdered catalytic material with a vapor stream of the hydrocarbons in a catalytic conversion zone whereby carbonaceous deposits accumulate on the catalyst and thereafter contacting the used catalyst with an oxygen-containing gas in a regeneration zone to burn off the deposits, the steps including introducing particles of used catalytic material to the regeneration zone, flowing a stream of an oxygen-containing gas upwardly through the regeneration zone at a velocity adapted to form a dense turbulent phase of the catalyst particles in said zone, adding used powdered catalyst to said dense phase and withdrawing corresponding amounts of regenerated catalyst therefrom at a rate adapted to maintain the average resident time of said particles within the regeneration zone at a suitable value, effecting said withdrawal of regenerated catalyst from the regeneration zone separate from the gaseous regeneration products through a catalyst withdrawal passageway opening directly at the lower portion of said dense phase, and continually introducing regenerated catalyst thus withdrawn under a pressure head, including that exerted by the dense phase of catalyst in the regeneration zone above the inlet to the catalyst withdrawal passageway, to said vapor stream of the hydrocarbons passing to the conversion zone.

9. The method of operating a catalytic conversion process employing hard catalyst particles which method comprises continuously introducing catalyst particles of about 150 to 400 mesh particle size into a vertical contacting zone, passing a gasiform stream upwardly through said contacting zone at such vertical velocity within the range of about 1 foot to about 2 feet per second as to maintain a bulk catalyst density in the lower part of said zone of at least about 10 pounds per cubic foot, continuously withdrawing a gasiform stream from the top of said contacting zone, separating catalyst particles from the withdrawn stream and returning the separated catalyst to the contacting zone, continuously removing catalyst material as a downwardly moving column through the base of the vertical contacting zone from a point in the contacting zone at which the bulk density of the catalyst is within the range of approximately 10 to 35 pounds per cubic foot, introducing an aerating gas into said column in an amount sufficient to maintain the catalyst in fluent form and of such density as to provide a pressure head at the base of the column sufficient to effect the introduction of said catalyst from the base of said column to a second contacting zone, passing catalyst from the base of said column to said second contacting zone and returning catalyst from said second contacting zone for reintroduction into the first-named vertical contacting zone.

10. The method of converting heavy hydrocarbons into gasoline which comprises dispersing small particles of a solid cracking catalyst consisting essentially of silica and at least one metal oxide in a gasiform stream consisting essentially of vapors of said heavy hydrocarbons at a cracking temperature, introducing said stream at the lower part of a cracking zone and passing said stream upwardly in said zone at a sufficiently low velocity to maintain a dense suspended catalyst phase therein, separating catalyst from said first stream, stripping said separated catalyst and introducing said stripped catalyst into a regeneration zone, introducing oxygen containing gas at the lower part of the regeneration zone and passing said oxygen containing gas upwardly in said regeneration zone at a sufficiently low velocity to maintain a dense phase of suspended catalyst therein, removing gases from the upper part of said regeneration zone while returning entrained catalyst from said gases to the dense suspended catalyst phase in the regeneration zone, downwardly withdrawing catalyst from the lower part of the regeneration zone as an aerated column of substantial height, introducing an aerating gas at a low point in the column in an amount sufficient to maintain the column of catalyst in fluent form and of such density as to provide a pressure head at its base sufficient to effect the dispersion of catalyst from the base of said column into the first-named stream, and utilizing the pressure head at the base of said column for dispersing catalyst from said column into said first-named stream.

11. The method of effecting catalytic cracking of heavy hydrocarbons for the production of gasoline which method comprises introducing a stream of hydrocarbons consisting essentially of gas oil into the lower part of a cracking zone containing hard porous particles, about 400 to 150 mesh in size, of a cracking catalyst consisting essentially of silica and at least one metal oxide, passing said stream in gaseous form upwardly in the cracking zone at a velocity within the approximate range of .3 to 3 feet per second whereby a fluidized dense phase of catalyst is maintained in said zone, maintaining said cracking zone at a temperature in the range of about 800 to 1000° F. under a pressure in the range of atmospheric to 50 pounds per square inch gauge whereby catalytic cracking is effected and a carbonaceous material accumulates on the catalyst, separating catalyst from said hydrocarbon stream, stripping said separated catalyst with a stripping gas in a stripping zone, introducing stripped catalyst from the stripping zone into a regeneration zone, passing an oxygen containing gas upwardly in the regeneration zone at a velocity in the range of about 1 to about 2 feet per second whereby a fluidized dense phase of catalyst is maintained in said zone, maintaining a temperature, pressure and catalyst residence time in the regeneration zone for effecting combustion of carbonaceous material from the catalyst, separating and returning catalyst from gases leaving the upper part of the regeneration zone, downwardly withdrawing regenerated catalyst from the lower part of the regeneration zone as an aerated catalyst column of substantial length, introducing an aerating gas at a low point in said column in an amount to maintain the catalyst in fluent form and of such density as to provide a pressure head at the base of the column sufficient to effect transfer of the catalyst from the base of the column to the lower part of the cracking zone and transferring catalyst from the base of the column to the lower part of the cracking zone by introducing it into the hydrocarbon stream prior to the introduction of said stream into the cracking zone.

12. The method of contacting solids of small particle size with a plurality of gasiform streams which method comprises continuously introducing said solids into a first contacting zone, passing a first gasiform stream upwardly in said zone at a vertical velocity sufficient to maintain a mass of said solids in dense phase suspension therein, withdrawing said stream from the upper part of said zone, continuously withdrawing solids as a downwardly moving column directly from the dense phase in said zone, introducing sufficient aeration gas into said column to maintain the solids therein in fluent form, dispersing solids from the base of said column into a second gasiform stream, introducing said second gasiform stream and the solids dispersed therein at the base of a second contacting zone, passing said second gasiform stream upwardly in said second contacting zone at a vertical velocity sufficient to maintain the solids in a dense fluid phase therein, removing solids as a suspension in said second gasiform stream from said second contacting zone, separating solids from the withdrawn stream, introducing a third gasiform stream into the separated solids for displacing at least a part of the second gasiform stream therefrom, and thereafter returning said solids for said introduction to said first contacting zone.

JAMES M. PAGE, Jr.

REFERENCES CITED

The following references are of record in the file of this patent:

UNITED STATES PATENTS

| Number | Name | Date |
|---|---|---|
| 1,475,502 | Manning | Nov. 27, 1923 |
| 1,577,534 | Miller | Mar. 23, 1926 |
| 1,984,380 | Odell | Dec. 18, 1934 |
| 2,039,904 | Hill | May 5, 1936 |
| 2,226,578 | Payne | Dec. 31, 1940 |
| 2,239,801 | Voorhees | Apr. 29, 1941 |
| 2,247,097 | Menshih | June 24, 1941 |
| 2,264,438 | Gaylor | Dec. 2, 1941 |
| 2,270,903 | Rudback | Jan. 27, 1942 |
| 2,273,075 | Weems | Feb. 17, 1942 |
| 2,302,209 | Goddin | Nov. 17, 1942 |
| 2,305,569 | Degnen | Dec. 15, 1942 |
| 2,325,136 | Kassel | July 27, 1943 |
| 2,326,705 | Thiele et al. | Aug. 10, 1943 |
| 2,327,175 | Conn | Aug. 17, 1943 |
| 2,331,433 | Simpson et al. | Oct. 12, 1943 |
| 2,340,878 | Holt et al. | Feb. 8, 1944 |
| 2,360,787 | Murphree et al. | Oct. 17, 1944 |

FOREIGN PATENTS

| Number | Country | Date |
|---|---|---|
| 23,045 | Great Britain | 1910 |
| 331,322 | Great Britain | July 3, 1940 |
| 533,037 | Germany | Sept. 8, 1931 |